United States Patent [19]

Perry

[11] Patent Number: 4,734,007
[45] Date of Patent: Mar. 29, 1988

[54] FAN CASING AND FAN BLADE LOADING/UNLOADING

[75] Inventor: Derick A. Perry, Derby, England

[73] Assignee: Rolls-Royce plc, London, England

[21] Appl. No.: 96,297

[22] Filed: Sep. 9, 1987

Related U.S. Application Data

[63] Continuation of Ser. No. 21,348, Mar. 3, 1987, abandoned.

[51] Int. Cl.⁴ .......................... F01D 5/30; F01D 21/00
[52] U.S. Cl. ........................................ 415/9; 415/174;
  415/197; 415/201; 415/219 R
[58] Field of Search ............... 415/1, 9, 118, 219 R,
  415/170 R, 174, 201, 126, 128, 196, 197, DIG. 3

[56] References Cited

U.S. PATENT DOCUMENTS

| | | | |
|---|---|---|---|
| 2,851,214 | 9/1958 | Busquet | 415/201 |
| 3,386,155 | 6/1968 | Jenkinson | 415/201 |

FOREIGN PATENT DOCUMENTS

| | | | |
|---|---|---|---|
| 362286 | 3/1930 | United Kingdom | 415/D3 |
| 1095376 | 12/1967 | United Kingdom . | |
| 1291943 | 10/1972 | United Kingdom . | |
| 1369229 | 10/1974 | United Kingdom . | |
| 2114233 | 8/1983 | United Kingdom . | |
| 2165313 | 9/1985 | United Kingdom . | |
| 2159886 | 12/1985 | United Kingdom | 415/219 R |

*Primary Examiner*—Robert E. Garrett
*Assistant Examiner*—Therese M. Newholm
*Attorney, Agent, or Firm*—Cushman, Darby & Cushman

[57] ABSTRACT

A fan casing of a turbofan gas turbine engine has a slot which extends generally in a circumferential direction and which has an aerofoil section. A variable pitch fan blade may be removed from the turbofan by rotating the fan blade about its axis of rotation to fine pitch setting, and rotating the fan rotor so as to align the tip of the fan blade with the slot. The fan blade is detached from the fan rotor and the tip of the fan blade is inserted radially into the slot. The root portion of the fan blade is then moved in a radially outwards and axial direction to remove the fan blade. The slot in the casing allows the fan blade to be loaded by the reverse procedure. Loading/unloading of a fan blade is made possible without removing the fan casing.

10 Claims, 4 Drawing Figures

FAN CASING AND FAN BLADE LOADING/UNLOADING

This is a continuation of application Ser. No. 021,348, filed Mar. 3, 1987, which was abandoned upon the filing hereof.

The present invention relates to fan casings and fan blades of turbofan gas turbine engines and is particularly concerned with an arrangement for loading or unloading of the fan blades from the fan rotor.

The fan blades of turbofan gas turbine engines are loaded onto or unloaded from the fan rotor only when the fan casing has been moved, or removed at least partially, so to allow access to the fan blade and fan rotor.

This necessitates the removal of the complete or whole turbofan engine from an associated aircraft should it be necessary to replace a damaged fan blade.

The present invention seeks to provide a fan casing and fan blade loading/unloading arrangement in which the fan blades can be removed from the turbofan gas turbine engine without moving or removing the fan casing of the turbofan gas turbine engine.

Accordingly the present invention provides a fan assembly for a turbofan gas turbine engine comprising a fan rotor, a plurality of fan blades and an annular fan casing, the fan blades being removably secured to the fan rotor, the fan blades having tips at their radially outer extremity and root portions at their radially inner extremity, the fan casing being arranged coaxially with the fan rotor and surrounding the fan blades, the fan casing having an interior surface and an exterior surface, the fan casing having a slot, the slot being formed on the interior surface of the fan casing, the fan casing having a plug, the plug being removably secured in the slot to form a continuation of the interior surface of the fan casing, the slot in the fan casing being in substantially the same plane as the fan blades, the slot in the fan casing being dimensioned so as to receive the tip of a fan blade, the tips of the fan blades being alignable with the slot in the interior surface of the fan casing, and the tips of the fan blades being insertable into the slot in the interior surface of the fan casing to allow loading or unloading of the fan blades.

The fan blades may be variable pitch fan blades, the pitch of the fan blades is variable such that their tips are alignable with the slot in the interior surface of the fan casing, the root portions of the fan blades being detachable from the fan rotor such that the tips of the fan blades are insertable into the slot, the root portions of the fan blades being moveable in both radial, and axial directions to allow loading or unloading of said fan blades.

The slot may have an aerofoil section.

The slot may extend in a circumferential direction.

The fan casing may comprise a containment ring, the slot being formed at least partially in the containment ring.

The containment ring may comprise a continuous single hoop of a woven fibrous material, the slot being formed in the woven fibrous material.

The containment ring may comprise two continuous hoops of a woven fibrous material, the two continuous hoops being axially spaced, the slot being formed axially between the two continuous hoops.

The fan assembly, may comprise a plurality of bearing assemblies and a plurality of bearing casings, the root portion of each fan blade being rotatably mounted on the fan rotor by one of the bearing assemblies and one of the bearing casings, the root portion, the said bearing assembly and the said bearing casing forming an integral assembly.

Each of the bearing casings may have an outer surface and a flange, the outer surface of each of the bearing casings being screw threaded, the fan rotor having a plurality of circumferentially spaced housing, each housing having an inner surface and a flange, the inner surface of each of the housings being screw threaded, each bearing casing being removably secured in a respective one of the housings, the screw thread on the outer surface of said bearing casing being engageable with the screw thread on the inner surface of said housing.

The flange on said bearing casing may be releasably secured to the flange on said housing.

The present invention will be more fully described by way of example with refrence to the accompanying drawings in which.

Figure 1:
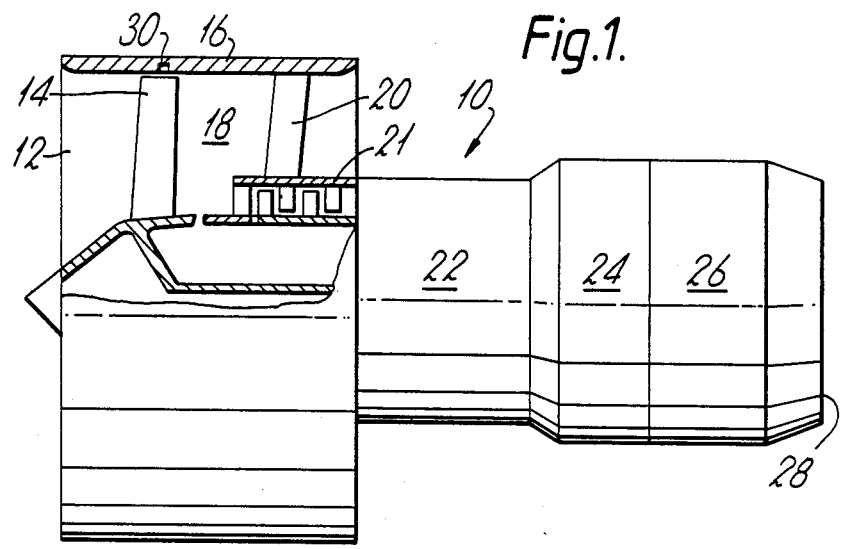
FIG. 1 is a partially cut away view of a turbofan gas turbine engine having a fan casing and a fan blade loading/unloading arrangement according to the present invention.

A turbofan gas turbine engine 10 is shown in FIG. 1 and comprises an inlet 12, a fan 14, a compressor 22, a combustion chamber 24, a turbine 26 and an exhaust nozzle 28 arranged in flow series. The gas turbine engine works conventionally in that air is compressed initially by the fan, and a portion of the air flows through a fan duct 18 defined by a fan casing 16, and the remainder of the air flows into the compressor to be further compressed. The compressed air is supplied into the combustion chamber, where fuel is burnt in the compressed air to produce hot gases. The hot gases flow through and drive the turbine, which is arranged to drive the fan and compressor via a shaft or shafts.

Figure 2:
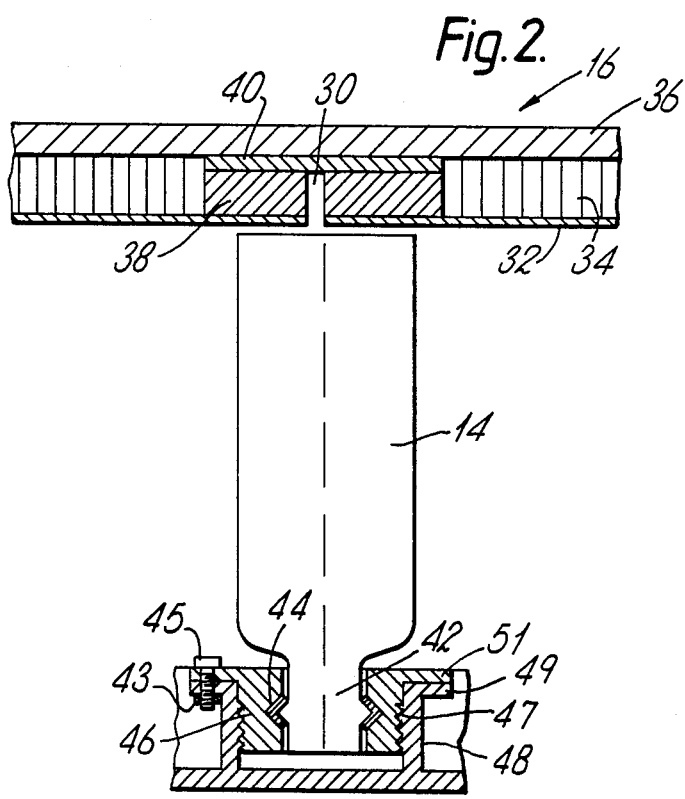
FIG. 2 is an enlarged cross-sectional view of the fan casing and fan blade of FIG. 1 showing the fan blade when loaded.

The fan casing 16 is secured to the core engine casing 21 by a plurality of struts 20 which extend across the fan duct 18. The fan casing 16, as shown more clearly in FIG. 2, comprises an inner metal sheet 32 and an outer metal sheet 36 with a honeycomb structure 34 positioned therebetween. Containment rings 38 and 40 are provided in the fan casing 16 around the fan blades 14, to contain the fan blades within the fan casing should a fan blade become detached from the hub of the fan rotor during operation of the gas turbine engine.

The containment rings of the fan casing are of any suitable construction as known in the art, and for example may comprise continuous wound layers of a woven fibrous mterial, the fibrous material may comprise glass fibres, carbon fibres, metallic fibres or aromatic polyamide fibres. The fibre which is most suitable is that made by Du Pont Limited and sold under the Registered Trademark KEVLAR. The containment ring could also be steel or other metallic ring.

The fan casing 16 is provided with an elongate slot 30 in its inner surface which has an aerofoil section so as to receive the tip of a fan blade 14. The slot 30 is arranged to extend generally in a circumferential direction, and is arranged to be substantially in the same plane as the axes of the fan blades 14. The slot is dimensioned so as to receive the tip of a fan blade, and to allow a blade to be removed.

The slot 30 extends radially into, and is formed partially by, the containment ring 38, but because the slot extends circumferentially the hoop strength of the containment ring is maintained, the provision of an axially extending slot in the containment ring would greatly reduce the hoop strength and containing strength of the fan casing.

The fan blades 14 are of the variable pitch type and each has a root portion 42 which is rotatably mounted in a corresponding housing 48 of the fan rotor by a bearing assembly 44 and a bearing casing 46. The fan blades 14 are removably secured to the housing 48 of the fan rotor by suitable means as is well known in the art. Our copending British Patent application No. 8618313 discloses a particularly suitable fan blade with an aerofoil and a root portion in which the bearing casing, bearing assembly and root portion form an integral assembly to allow easy removal of the fan blade from the housing of the fan rotor. In the fore mentioned patent application the bearing casing is secured to the housing of the fan rotor by a screw thread arrangement 47 formed on the outer surface of the bearing casing and on the inner surface of the housing, and by nuts and bolts or other suitable fastening means, which extend through apertures in flanges 49 and 51 formed on the housing and bearing casing respectively.

Figure 3:
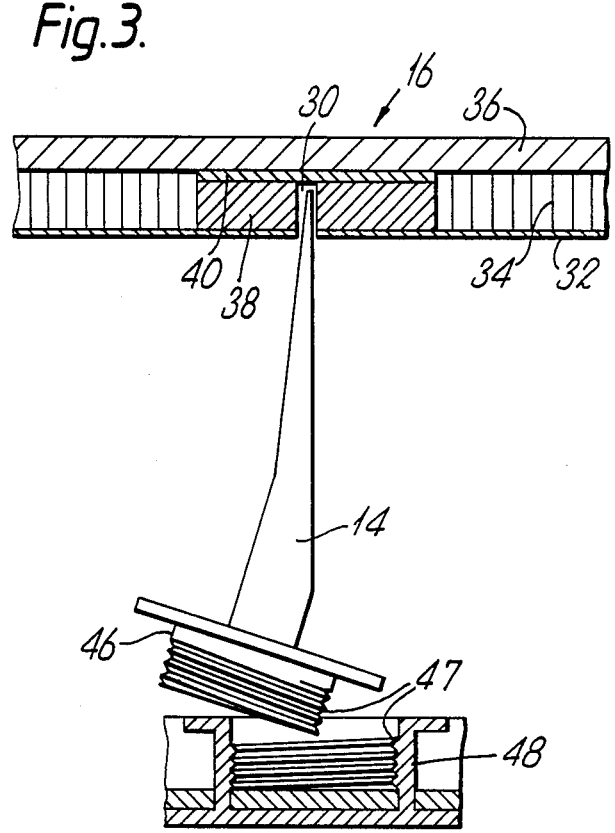
FIG. 3 is an enlarged cross-sectional view of the fan casing and fan blade of FIG. 1 showing the fan blade during loading/unloading.
Figure 4:
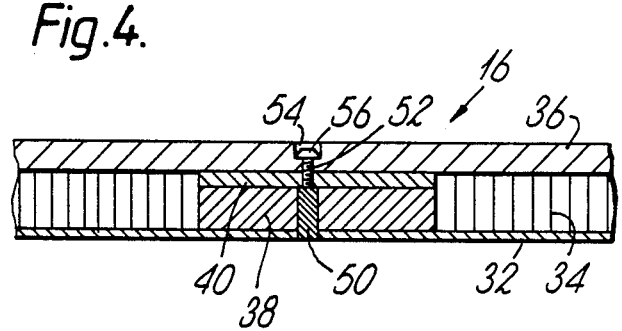
FIG. 4 is an enlarged sectional view of the fan casing of FIG. 1 showing the fan casing during operation of the turbofan gas turbine engine.

A fan blade 14 is removed from the housing 48 of the fan rotor as shown in FIG. 3 by rotating the fan blade to fine pitch about its axis of rotation, and also rotating the fan about the engine axis so that the tip of the fan blade lines up with the slot 30 in the fan casing 16. The fan blade 14 is then detached from the housing 48 of the fan rotor by removing the fastening means, i.e. unfastening the nuts and bolts and unscrewing the bearing casing from the housing. The fan blade is moved radially outwards so that the tip of the fan blade is inserted into the slot, and the root portion is removed from the housing.

The root portion of the fan blade is moved, i.e. swung, in un upstream and radial direction to allow the tip of the fan blade to be removed from the slot, and so complete the removal of the fan blade.

To load a fan blade, the tip of the fan blade is aligned with the slot in the fan casing. The tip of the fan blade is inserted into the slot and the root portion of the fan blade is moved, i.e. swung, in a downstream and radial direction to align the root portion with the housing of the fan rotor. The fan blade is then moved radially inwards so that the tip of the fan blade leaves the slot in the fan casing and the root portion of the fan blade locates in the housing of the fan rotor. The root portion of the fan blade is then secured to the housing of the fan rotor and the fan blade is rotated about its axis to its operating position.

The slot in the fan casing may be filled with a removable plug 50 which is secured to the fan casing by a screw 52 and a nut 54, the screw extends through the fan casing 16 to a recess 56 in the external surface of the fan casing 16. The plug ensures a smooth aerodynamic continuation of the interior surface of the fan casing during operation of the turbofan gas turbine engine, and is removed to allow a fan blade to be removed.

If the containment ring is formed from a woven fibrous material, the containment ring may be formed with the circumferentially extending slot, preferably by winding the woven material around a former which defines the slot, to produce a continuous single hoop of containment material with a slot formed in it. Alternatively two continuous hoops of woven fibrous material are axially spaced to define a circumferential space, and a filler material is used to fill the majority of the circumferential space and to define the circumferential ends of the slot.

Although the slot has been shown to extend into the containment ring, it may be possible to arrange for the slot to extend only into the honeycomb structure, and to provide the containment ring around the honeycomb structure, and therefore the hoop strength of the containment ring is maintained.

The arrangement therefore allows a fan blade to be removed from the turbofan gas turbine engine without the need to remove the fan casing. This enables fan blades to be removed from the turbofan gas turbine engine whilst the engine is secured to the associated aircraft i.e. it is not necessary to remove the engine from the aircraft as is required by conventional arrangements.

The arrangement also allows a fan blade to be removed without any significant reduction in the hoop strength of the containment ring.

I claim:

1. A fan assembly for a turbofan gas turbine engine comprising a fan rotor, a plurality of fan blades and an annular fan casing, the fan blades being removably secured to the fan rotor, the fan blades having tips at their radially outer extremity and root portions at their radially inner extremity, the fan casing being arranged coaxially with the fan rotor and surrounding the fan blades, the fan casing having an interior surface and an exterior surface, the fan casing having a slot, the slot being formed on the interior surface of the fan casing, the fan casing having a plug, the plug being removeably secured in the slot to form a continuation of the interior surface of the fan casing, the slot in the fan casing being in substantially the same plane as the fan blades, the slot in the fan casing being dimensioned so as to receive the tip of a fan blade, the tips of the fan blades being alignable with the slot in the interior surface of the fan casing, and the tips of the fan blades being insertable into the slot in the interior surface of the fan casing to allow loading or unloading of the fan blades.

2. A fan assembly as claimed in claim 2 in which the fan blades are variable pitch fan blades, the pitch of the fan blades is variable such that their tips are alignable with the slot in the interior surface of the fan casing, the root portions of the fan blades being detachable from the fan rotor such that the tips of the fan blades are insertable into the slot, the root portions of the fan blades being moveable in both radial, and axial directions to allow loading or unloading of said fan blades.

3. A fan assembly as claimed in claim 1 in which the slot has an airfoil section.

4. A fan assembly as claimed in claim 1 in which the slot extends in a circumferential direction.

5. A fan assembly as claimed in claim 4 in which the fan casing comprises a containment ring, the slot being formed at least partially in the containment ring.

6. A fan assembly as claimed in claim 5 in which the containment ring comprises a continuous single hoop of a woven fibrous material, the slot being formed in the woven fibrous material.

7. A fan assembly as claimed in claim 5 in which the containment ring comprises two continuous hoops of a woven fibrous marterial, the two continuous hoops being axially spaced, the slot being formed axially between the two continuous hoops.

8. A fan assembly as claimed in claim 2 comprising a plurality of bearing assemblies and a plurality of bearing casings, the root portion of each fan blade being rotatably mounted on the fan rotor by one of the bearing assemblies and one of the bearing casings, the root portion, the said bearing assembly and the said bearing casing forming an integral assembly.

9. A fan assembly as claimed in claim 8 in which each of the bearing casings has an outer surface and a flange, the outer surface of each of the bearing casings being screw threaded, the fan rotor having a plurality of circumferentially spaced housings, each housing having an inner surface and a flange, the inner surface of each of the housings being screw threaded, each bearing casing being removably secured in a respective one of the housings, the screw thread on the outer surface of said bearing casing being engageable with the screw thread on the inner surface of said housing.

10. A fan assembly as claimed in claim 9 in which the flange on said bearing casing is releasably secured to the flange on said housing.

* * * * *